US012080260B2

(12) United States Patent
Henkel

(10) Patent No.: US 12,080,260 B2
(45) Date of Patent: Sep. 3, 2024

(54) INSTRUMENT AND DEVICE RACK

(71) Applicant: Mott Mobile Systeme GmbH & Co. KG, Tauberbischofsheim (DE)

(72) Inventor: Gunter Henkel, Dresden (DE)

(73) Assignee: Mott Mobile Systeme Gmbh & Co. KG, Tauberbischofsheim (DE)

(*) Notice: Subject to any disclaimer, the term of this patent is extended or adjusted under 35 U.S.C. 154(b) by 92 days.

(21) Appl. No.: 17/764,216

(22) PCT Filed: Mar. 30, 2021

(86) PCT No.: PCT/DE2021/100313
§ 371 (c)(1),
(2) Date: Mar. 28, 2022

(87) PCT Pub. No.: WO2021/197547
PCT Pub. Date: Oct. 7, 2021

(65) Prior Publication Data
US 2023/0031890 A1 Feb. 2, 2023

(30) Foreign Application Priority Data

Mar. 31, 2020 (DE) .......................... 102020108979.1
Apr. 1, 2020 (DE) .......................... 102020109130.3
Apr. 28, 2020 (DE) .......................... 102020111588.1

(51) Int. Cl.
*G10G 5/00* (2006.01)
*F16M 11/04* (2006.01)
*F16M 11/10* (2006.01)

(52) U.S. Cl.
CPC ............. *G10G 5/00* (2013.01); *F16M 11/046* (2013.01); *F16M 11/10* (2013.01)

(58) Field of Classification Search
CPC ........ G10G 5/00; F16M 11/046; F16M 11/10; G10H 2230/365; G10H 1/32
See application file for complete search history.

(56) References Cited

U.S. PATENT DOCUMENTS

2018/0199705 A1  7/2018  Atkins

FOREIGN PATENT DOCUMENTS

| DE | 4225975 C1 | | 8/1993 | |
|---|---|---|---|---|
| WO | 2010040754 | * | 4/2010 | ........... F16M 11/041 |
| WO | WO-2010040754 A1 | * | 4/2010 | ........... F16M 11/041 |

OTHER PUBLICATIONS

Anonymous, "König & Meyer 18810 <Omega> Test :: Bonedo—PL1/3" May 8, 2012 (May 8, 2012), Retrieved from the Internet: https://www.bonedo.de/artikel/einzelansicht/km-18810-omega. html [retrieved on Jun. 14, 2021], XP055813607 pp. 1-3, Figs. 1-4.

(Continued)

*Primary Examiner* — Kimberly R Lockett
(74) *Attorney, Agent, or Firm* — Michael Soderman

(57) ABSTRACT

The object of the present invention is to provide an instrument and device rack for holding or storing electronic musical instruments and/or accessory equipment, which can be expanded in a simple and modular manner as required, and also to provide universal and orderly holding and arrangement of the musical instruments and/or accessory equipment or other accessories.

1. The modular instrument and device rack (1) for holding or storing electronic musical instruments and/or accessory devices, wherein two telescopically height-adjustable T-shaped foot elements (2) are connected via a connecting bridge (3) and at least two bearing elements (4) for a storage plate (5) are detachably fastened to the connecting bridge (3), wherein at least one extension element (7) can be detachably arranged on each at least of two bearing elements (4) via a respective support element (6) at least at one height and inclination deviating from the bearing elements (4), wherein in the case of two or more extension elements (7) to be arranged one above the other, the respective extension (Continued)

elements (7) are arranged respectively with a common support element (6) on the respective bearing element (4).

14 Claims, 10 Drawing Sheets

(56) References Cited

OTHER PUBLICATIONS

Anonymous, "?K&M 18820 Omega Pro Black—Thomann UK" May 1, 2019 (May 1, 2019), Retrieved from the Internet: https://www.thomann.de/gb/km_18820_omega_pro_black.htm [retrieved on Jun. 14, 2021] XP055813616 pp. 1, 2; Fig. 1.

Anonymous, "?K&M 18811 Black—Musikhaus Thomann" Apr. 1, 2018 (Apr. 1, 2018), pp. 1-1, Retrived from the Internet: https://www.thomann.de/de/km_18811_black.htm [retrieved on Jun. 15, 2021] XP055814154 p. 1, Fig. 1.

\* cited by examiner

INSTRUMENT AND DEVICE RACK

CROSS REFERENCE TO RELATED APPLICATIONS

This application is the U.S. national stage of International Application No. PCT/DE2021/100313, filed on 2021 Mar. 30. The international application claims the priority of DE 102020108979.1 filed on 2020 Mar. 31, the priority of DE 102020109130.3 filed on 2020 Mar. 1 and the priority of DE 102020111588.1 filed on 2020 Apr. 28; all applications are incorporated by reference herein in their entirety.

BACKGROUND

The invention relates to a modularly expandable instrument and device rack with cable management system for universal and orderly storage or placement of electronic musical instruments and/or accessory devices or other required accessories, such as, for example, not limited to speakers, microphones, computers and tablets PC, etc. On the one hand, the modularity allows for easy expansion or conversion with little or no intermediate disassembly, as well as incremental expansion or modification. Furthermore, the expandable instrument and device rack according to the invention enables the universal, orderly or structured and safe accommodation and arrangement of respective musical instruments, accessory devices, other accessories, and a more advantageous attendance of these.

The problem with existing solutions is that, as disclosed for example, by the patent DE 42 25 975 C1, there are only simple stands for electronic musical instruments such as keyboards or other accessory devices for the generation, design and processing of electronic or digital music or of sequences of notes or rhythms, and thus improvisation takes place to an extensive extent in the arrangement and respective placement of the corresponding devices and instruments, which leads to unclear arrangements and wiring and thus to substantial sources of danger, to arrangements unsafe in the situation and/or the conditions, to malfunctions or defects thus to time-consuming troubleshooting.

Furthermore, instrument racks are already known, which are offered, for example, by the company König & Meyer as keyboard table 'Omega' with attachments, whereby two T-shaped feet are arranged over a bridge, and the legs of the T-shaped feet are designed as a square and comprise two supports for a keyboard on the bridge or, alternatively, supports for a plate and supports for a keyboard or a storage shelf that can be arranged above it. The disadvantage of this solution is that extensions are only inconveniently associated with a considerable conversion or even replacement of components and thus the surplus of not required parts. In addition, the options for extensions and their arrangement are limited. Due to the square design of the legs of the T-shaped feet, any lateral attachments can only be arranged in predetermined angular dimensions limiting the possibilities and flexibility.

SUMMARY

The object of the present invention is to provide an instrument and device rack for holding or storing electronic musical instruments and/or accessory equipment, which can be expanded in a simple and modular manner as required, and also to provide universal and orderly holding and arrangement of the musical instruments and/or accessory equipment or other accessories.

The modular instrument and device rack (1) for holding or storing electronic musical instruments and/or accessory devices, wherein two telescopically height-adjustable T-shaped foot elements (2) are connected via a connecting bridge (3) and at least two bearing elements (4) for a storage plate (5) are detachably fastened to the connecting bridge (3), wherein at least one extension element (7) can be detachably arranged on each at least of two bearing elements (4) via a respective support element (6) at least at one height and inclination deviating from the bearing elements (4), wherein in the case of two or more extension elements (7) to be arranged one above the other, the respective extension elements (7) are arranged respectively with a common support element (6) on the respective bearing element (4).

DETAILED DESCRIPTION

The object of the present invention is to provide an instrument and device rack for holding or storing electronic musical instruments and/or accessory equipment, which can be expanded in a simple and modular manner as required, and also to provide universal and orderly holding and arrangement of the musical instruments and/or accessory equipment or other accessories.

With the invention, in the indicated application, it is achieved that instrument, and device rack provides receiving or storing electronic musical instruments and/or accessory devices as well as other accessories, wherein two telescopically height-adjustable T-shaped foot elements are connected via a connecting bridge. Depending on requirements, a storage plate is provided or present or can also be omitted so that a musical instrument can be placed directly thereon. If a storage plate is present, the storage plate can be placed on the bearing elements. In addition, the storage plate can be attached, fixed or secured to the bearing elements. The storage plate can have different widths and depths or cutouts or recesses. A support element can be arranged at least on each of the two bearing elements via a respective connecting element, and at least one respective extension element can be arranged on the respective support element at least in a fixedly detachable manner at one height differing from that of the bearing elements and via an angular adjustment in the inclination. A support element can be arranged at least on each of the two bearing elements via a respective connecting element, and at least one respective extension element can be arranged on the respective support element at least in a fixedly detachable manner at one height differing from that of the bearing elements and via an angular adjustment in the inclination. Thus, at least two extension elements are present.

At least two extension elements are preferably arranged at the same height and inclination respectively. The respective extension elements arranged in pairs and/or groups form, for example, an extension level. Thus, two or more extension elements to be arranged one above the other form, for example, corresponding extension levels. In the case of two or more extension elements to be arranged one above the other, the extension elements are respectively arranged with a common support element on the respective bearing element.

Thus, two or more extension elements to be arranged one above the other form, for example, corresponding extension levels.

The angle adjustment can be listed in one piece or in several pieces.

Advantageously, in or with the respective angle adjustment, the respective extension elements can be displaced or adjusted in their depth or length independently of or relative to the respective support elements.

For example, the respective angle adjustment can be arranged or changed at the respective support element at the desired height so that the respective extension elements can be arranged with the respective angle adjustment correspondingly at the desired height.

The angle adjustment can be listed in one piece or in several pieces. The angle adjustment comprises one, two or more angle adjustment plates denoted arranged at or around the respective support element and respective extension element. The angle adjustment plates of the angle adjustment are arranged at least in each case laterally on opposite sides on the respective support element and respective extension element and/or at least partially embrace the respective extension element. Thus, a one-piece design of angle adjustment is also possible, for example, as an edged angle adjustment plate.

In addition, in the angle adjustment or in the respective angle adjustment plate of the angle adjustment, a variety of apertures or bores arranged crescent-shaped next to one another are provided for an adjustment and fixing in the corresponding angle of inclination. These respective apertures or holes are congruent with respect to the lateral position of the respective angle adjustment plate of the angle adjustment on the opposite sides on the respective support element and respective extension element. In addition, in the respective support element and respective extension element, matching the respective apertures or bores of the respective angle adjustment plate of the angle adjustment, at least one individual bore or aperture respectively is present so that a fastening means, such as a screw or a bolt, for example, can be guided in a corresponding angle position and position through one of the respective apertures or bores of the respective angle adjustment plate of the angle adjustment and at least one individual bore or aperture of the respective support element and respective extension element.

The length, position and/or height of the respective extension element can be advantageously adjusted via correspondingly arranged oblong holes in the respective angle adjustment plate of the angle adjustment and correspondingly arranged bores in the respective support element and/or respective extension element.

Furthermore, it is not excluded that in each case, an extension element forms its own extension plane, which is correspondingly aligned or arranged independently of the neighboring extension element or its extension level. Such configurations are conceivable, for example, in the case of smaller musical instruments and/or accessory devices or components which do not extend or need not extend over two adjacent extension elements.

This results in a modular design that allows for arbitrary expandability without having to perform substantial disassembly. In addition, the individual basic parts or individual components can continue to be used in the event of an extension or reduction without having to replace them. Further, the instrument and device rack according to the invention achieves a structured arrangement of the respective musical instruments, accessory devices and the other accessories, which significantly improves the attendance or work on or with the rack and improves the reliability of the functional interaction. In addition, the wiring of the individual musical instruments, accessory devices and further accessories can be advantageously routed to avoid tripping hazards or accidental unplugging or snagging and can be reduced to a few or a single cable leaving the instrument and device rack.

In addition to ordinary T-shaped foot elements with only one telescopic height-adjustable section, i.e. vertical section, the telescopic height-adjustable T-shaped foot elements also include double or multiple T-shaped foot elements with two or more telescopic vertical sections in the vertical range. Thus, triple or quadruple T-shaped foot elements with a corresponding number of telescopic vertical sections are also possible.

The individual musical instruments, accessory devices and other accessories can also be abbreviated as components that can be used for the respective music production. In this context, the specific designation as a musical instrument, accessory device and further accessories is by no means conclusive and is only listed by way of example.

Advantageous designs of the invention are presented in the sub-claims.

The advantage of this is the extendibility of the respective support element, wherein a further support element or a further support element section is inserted into a first or lower support element or a first or lower support element section. This further support element or further support element section is tapered for this purpose in the overlap range. Likewise, the first or lower support element or the first or lower support element section may be tapered in the overlap range, and the further support element or the further support element section is plugged onto the first or lower support element or the first or lower support element section.

Alternatively, the support elements or support element sections can respectively be connected with a connecting piece inserted in the connecting area, whereby the connecting piece has corresponding overlap ranges to the respective support element or support element section. The support elements or support element sections do not overlap in this case. An inconspicuous extension of the respective support element is thus more easily possible. In addition, individual extensions and combinations of support elements of different lengths are possible.

By arranging the respective support element on the respective bearing element to be adjustable in height and/or inclination, the respective support elements can be adapted according to requirements independently of the respective extension element. Moreover, additional variability and simplification is achieved since different long support elements can be used, which can be arranged along their longitudinal extension correspondingly on the bearing element.

In further development, at least the respective support element is arranged on the one connecting element so as to be adjustable in height and/or inclination. This achieves a design simplification that allows different support elements or different types or designs of support elements to be used and these to be mounted, adapted or dismounted with reduced effort.

In further development, at least one connecting element is adjustably connected or arranged to the respective bearing element in terms of position and/or inclination so that an additional adaptation and adjustment option is thereby provided.

By arranging the respective extension elements on the respective support element so that they can be adjusted in height, position or depth via the angle adjustment, the respective extension elements can be adapted according to requirements independently of the respective support element.

In the case of two or more extension elements to be arranged one above the other, the respective extension elements, which are arranged individually or optionally in pairs or grouped at the same height, can be arranged or aligned individually independently of the other extension elements, which may be arranged at a different extension level. This improves the diversity of variants and also achieves a design simplification that allows the respective extension elements to be assembled, adapted or disassembled with reduced effort.

In further development, the respective extension elements are each or individually infinitely variable in length and/or are connected to one another via a transverse holder so that the extension elements can be adapted to the musical instruments and/or accessory devices or components to be stored, depending on their use and grouping. In addition, the relative position of the musical instruments and/or accessories or components to be stored can also be adjusted to the user.

By the respective extension elements forming a storage shelf or carrying a shelf, the musical instruments and/or accessory devices or components can be arranged individually on or in the respective extension level formed by one, two or extension elements. Depending on the size of the musical instruments and/or accessory devices or components, a shelf may or may not be required.

While at least the vertical sections of the T-shaped foot elements have at least one telescopic round tube, wherein a lateral attachment can be attached at least to one of the telescopic round tubes in a fixedly releasable and/or pivotable and/or vertically adjustable manner, the lateral attachments can be rotated continuously in the vertical axis of the vertical section in any angular positions and attached there in a fixedly releasable manner, i.e. fixedly releasably thereto.

The continuously variable adjustability to any angular positions allows the lateral attachments to be rotated continuously behind the storage plate when the storage plate is correspondingly deep and to be fastened in this position. In this way, even very wide instruments or two instruments can be accommodated side by side on the rack or storage plate without having to dismantle the lateral attachments or occupy the necessary space.

This also allows to use very wide, i.e. laterally projecting, storage plates.

While at least one lateral attachment comprises, for example, at least one pivot arm, tray, storage shelf and/or holder, further musical instruments and/or accessory devices or components, such as, for example, but not limited to speakers, microphones or portable computers or documents or sheet music can be arranged as required. It also includes other corresponding accessories or auxiliaries which can be attached to the lateral attachment.

Depending on requirements, the pivot arm, the tray, the storage shelf and/or the holder can each be arranged and combined individually and independently. The pivot arm, the tray, the storage shelf and/or the holder can be arranged individually, in groups or combined as required and in different numbers and combinations per side. The pivot arm, the tray, the storage shelf and/or the holder can also be omitted.

In further development, at least one lateral attachment comprises a round tube as a vertical holding element, wherein at least one pivot arm, at least one tray, at least one shelf and/or at least one holder can be attached to the vertical holding element in a fixedly detachable and/or pivotably and vertically adjustable manner at different heights. This allows at least one pivot arm, at least one tray or storage shelf, or at least one holder to be arranged individually. An extension and modification are easily possible for the mentioned as well as for other not mentioned accessories or auxiliaries.

In addition, the pivot arm may have at least one joint. The joint may be present at least at one of the ends of the pivot arm and/or additionally in the course or extension thereof. Depending on the position of the respective joint, the pivot arm has at least one arm section or two or more arm sections. The respective joint is such that the pivot arm or the respective arm section can be bendable at least once about a vertical and/or horizontal axis.

Thus, the pivot arm can have a joint or joint section at least in one of the areas of the respective attachment, such as on the vertical holding element and/or the lateral attachment in the area of the attachment on the vertical section of the T-shaped foot elements so that additional swiveling of the pivot arm and/or lateral attachment is also possible in this area without having to loosen the respective support or attachment. A pivot arm can therefore also have only one arm section.

By having at least one housing and/or at least one holding compartment and/or storage compartment, accessory devices or components can be integrated or arranged therein in a functionally reliable and orderly manner, but also in a more precise manner. Different accessory devices or components can only be operated from the front and/or can be stacked. For other accessory devices or components, vertical operation or vertical storage or arrangement is provided or required or results from the design.

By arranging at least one housing and/or at least one holding compartment and/or storage compartment fixedly detachably fastened to at least two bearing elements and/or to additional mounting elements on the connecting bridge and/or on the connecting bridge and/or on the vertical section of at least one of the T-shaped foot elements, a more efficient operation of the accessory devices or components arranged in at least one housing and/or at least one holding compartment is achieved. Moreover, all accessory devices or components, as well as the further accessory devices or musical instruments can be wired in the shortest way.

At least one housing and/or at least one holding compartment and/or storage compartment may be arranged at different heights.

At least one housing and/or at least one holding compartment and/or storage compartment may have different heights, widths and/or depths.

By having the housings or holding compartments or storage shelves in front of or below the connecting bridge and in the area between the T-shaped foot elements, operation and monitoring of the accessory devices or components housed therein is simplified.

While a pull-out shelf is arranged on the bearing elements or between the holding compartments and/or between two extension elements and/or on the additional mounting elements on the connecting bridge and/or on the connecting bridge, keyboards or documents can be deposited and, if required, can be hidden from view or concealed or put away by pushing in the storage area so that these objects or documents respectively deposited on the storage area do not interfere, at least temporarily.

While the housing is a 19-inch rack housing, appropriately suitable or adapted or matching accessory devices or components can be arranged reliably and organized in the housing. Accidental shifting or tilting can be avoided.

By arranging at least one socket or one power distribution unit or fixtures for at least one socket or power distribution unit on the bearing elements and/or on the connecting bridge, the necessary cabling can be implemented directly on the rack and over short distances. Delicate and error-prone cabling can be avoided. Power distribution units also include sockets. Thus, the power distribution units also provide the usual mains voltage of, for example, 230 V for operating most accessory devices or components or instruments.

The power distribution unit also additionally or alternatively provides at least one low voltage in at least one voltage range, as required. Voltage ranges may include, for example, 5 V, 9 V, and/or 12 V. Other or further voltage ranges such as 18 V, 24 V or 36 V or other voltage ranges not mentioned are not excluded. Advantageously, this avoids that each individual accessory device or component, which requires an operating voltage differing from the usual mains voltage, does not need its own power supply unit or plug-in power supply, but is supplied with the necessary operating voltage from a central power supply. Unclear cabling and inefficiently used sockets and thus recessed space are avoided. In addition, the central supply with low voltage replaces the switching power supplies usually used and thus minimizes the emission of electromagnetic radiation caused by the individual switching power supplies usually used so far, which has a positive effect on the signal processing of the accessory devices or components and on the user.

In addition, cable ducts or cable guides such as cable clamps can also be provided, which promote orderly and reliable cabling, and it is also possible to minimize unfavorable stray and interfering influences on and between the signal lines with appropriately suitable cable ducts and cable guides.

By providing at least lighting, additional light sources are not required. In addition, unfavorable shadowing of a separate lighting, as well as disturbing installation and wiring of the additional lighting to be mounted or displayed, are avoided. For example, the lighting is provided or integrated with or at least on one of the extension elements. In addition, the lighting may be integrated with the transverse holder. It is also possible to arrange lighting, for example, as a linear luminaire, between two extension elements. The lighting can be hooked into the extension elements.

While the main switch and/or light switch in the front area on at least one of the bearing elements and/or extension elements and/or on the storage plate, the entire system and, if necessary, additionally the light can be switched on and off with only a few simple steps. A cumbersome search for the respective switch can be omitted since these are well attainable and depending upon concrete arrangement if necessary in addition visible.

By arranging a fixed or movable mounting hole plate at least on one housing and/or at least on one holding compartment and/or on the vertical section at least of one of the T-shaped foot elements, cables, or other auxiliaries can be provided in an orderly manner. Thus, insertable or suspendable patch cables can be accommodated. It is not excluded that this mounting hole plate serves as a place holder for cables already plugged into components or network devices on one side, which, if necessary, only need to be plugged into the respective instrument, accessory device or component on one side. In this connection, one or more cable windings may further be provided, which provide for order and clarity and for initially short cable sections, whereby tripping hazards or errors in the connection or cabling may be avoided.

BRIEF DESCRIPTION OF THE DRAWINGS

Several examples of the invention are shown in the drawings and are described in more detail below. The following is shown.

DETAILED DESCRIPTION OF THE PREFERRED EMBODIMENTS

Figure 1:
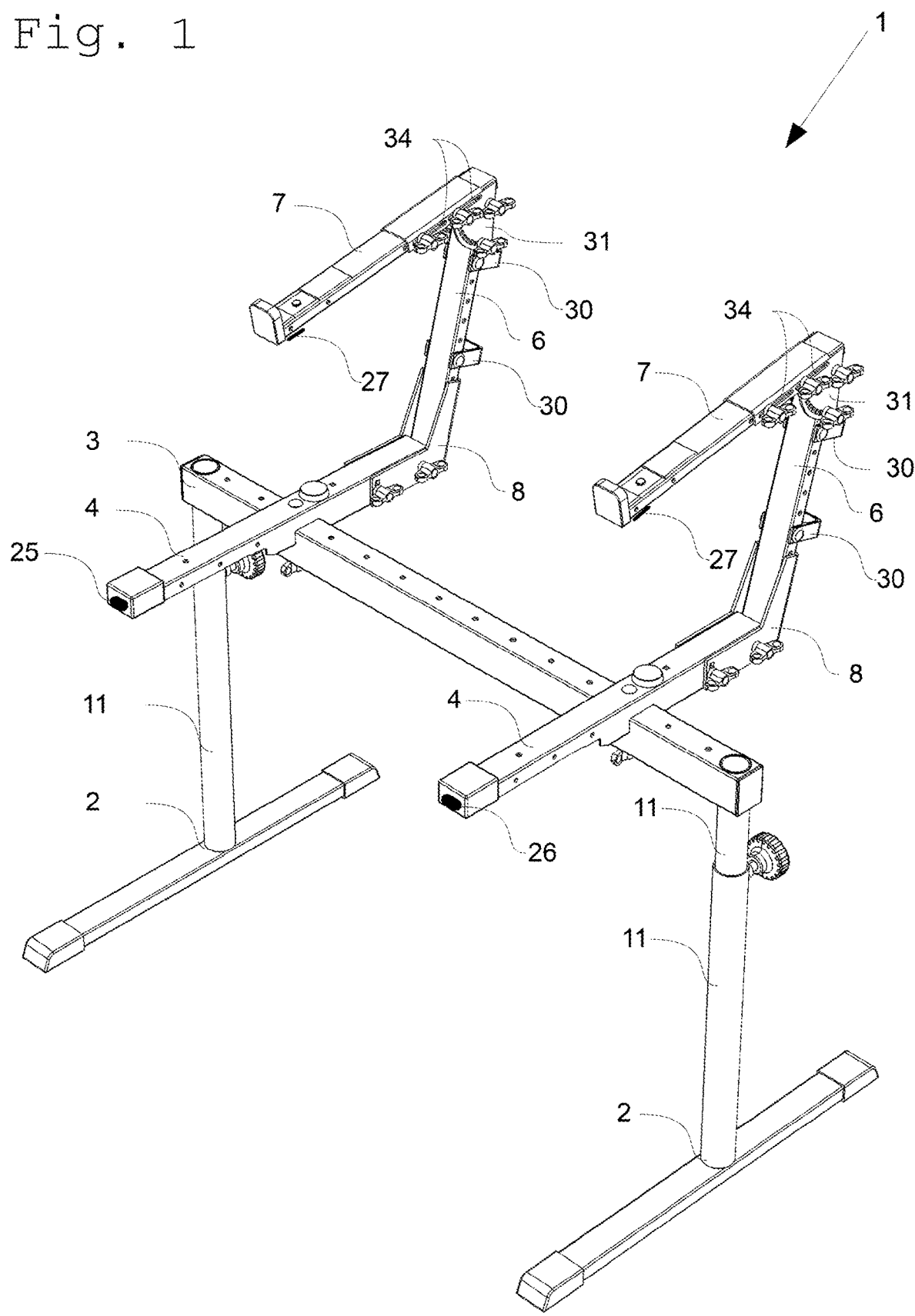
FIG. 1 spatial representation of a modular instrument and device rack in a simplified design, FIG. 2 spatial representation of a modular instrument and device rack in a simplified design with lateral attachments, FIG. 3 spatial representation of a modular instrument and device rack in an extended version, FIG. 4 spatial representation of a modular instrument and device rack in a simplified design with storage shelves, FIG. 5 spatial representation of a modular instrument and device rack in an extended version with storage shelves and lateral attachments, FIG. 6 spatial representation of a modular instrument and device rack in an extended version with storage shelves, housing, and lateral attachments, FIG. 7 spatial representation of a modular instrument and device rack in a simplified design with storage shelves and lateral attachments, FIGS. 8 and 9 spatial representation of a modular instrument and device rack in an extended version with storage shelves and lateral attachments and FIG. 10 spatial view from the rear of a modular instrument and device rack in a simplified design.

FIG. 1 shows a spatial representation of a modular instrument and device rack 1 according to the invention for holding or storing electronic musical instruments and/or accessories, wherein two telescopically height-adjustable T-shaped foot elements 2 are connected via a connecting bridge 3 and at least two bearing elements 4 for a storage plate 5 not shown are detachably fastened to the connecting bridge 3, wherein at least one respective extension element 7 is fixedly detachably arranged at least on two bearing elements 4 via a respective support element 6 at least at one height and inclination deviating from the bearing element 4. The inclination of the respective extension element 7 can be adjusted in steps in each case by means of an angle adjustment 31. On this occasion, the angle adjustment 31 comprises two angle adjustment plates 31, each of which is arranged laterally on opposite sides on the respective support element 6 and the respective extension element 7. A one-piece design, for example, of an edged angle adjustment plate 31 as an angle adjustment 31, which, for example, surrounds the respective extension element 7 at least in certain areas, is also possible. Furthermore, in the angle adjustment 31 or in the respective angle adjustment plate 31 of the angle adjustment 31 there are apertures arranged arching next to one another for an adjustment and fixing in the corresponding angle of inclination. The angle adjustment 31 is present here in each case on the respective extension element 7. The respective angle adjustment 31 is arranged on the respective support element 6 at the desired height so that the respective extension element 7 is also arranged on the respective support element 6 at the corresponding height. A change in height is possible by means of a corresponding conversion.

Oblong holes 34 in the respective angle adjustment plate 31 of the angle adjustment 31 in the area of the respective extension element 7 and matching bores thereto in the respective extension element 7, through which screws or bolts are guided, permit a stepless change and adjustment of the length of the respective extension element 7.

The respective support elements 6 are each arranged with connecting elements 8 on the two bearing elements 4. Two telescopically height-adjustable T-shaped foot elements 2 are each designed as ordinary T-shaped foot elements 2, each with a telescopic round tube 11 in the vertical section 11. Cable holders 30 are also provided at the rear of the support elements 6.

The respective connecting elements 8 also have apertures for adjustment and fixing at the corresponding angle of inclination. At present, the connecting elements 8 are arranged in a central position on the two bearing elements 4.

Furthermore, the lighting 27 is arranged in each case at the front end on the underside of the two extension elements 7, which are adjacent in a plane in pairs.

Figure 2:
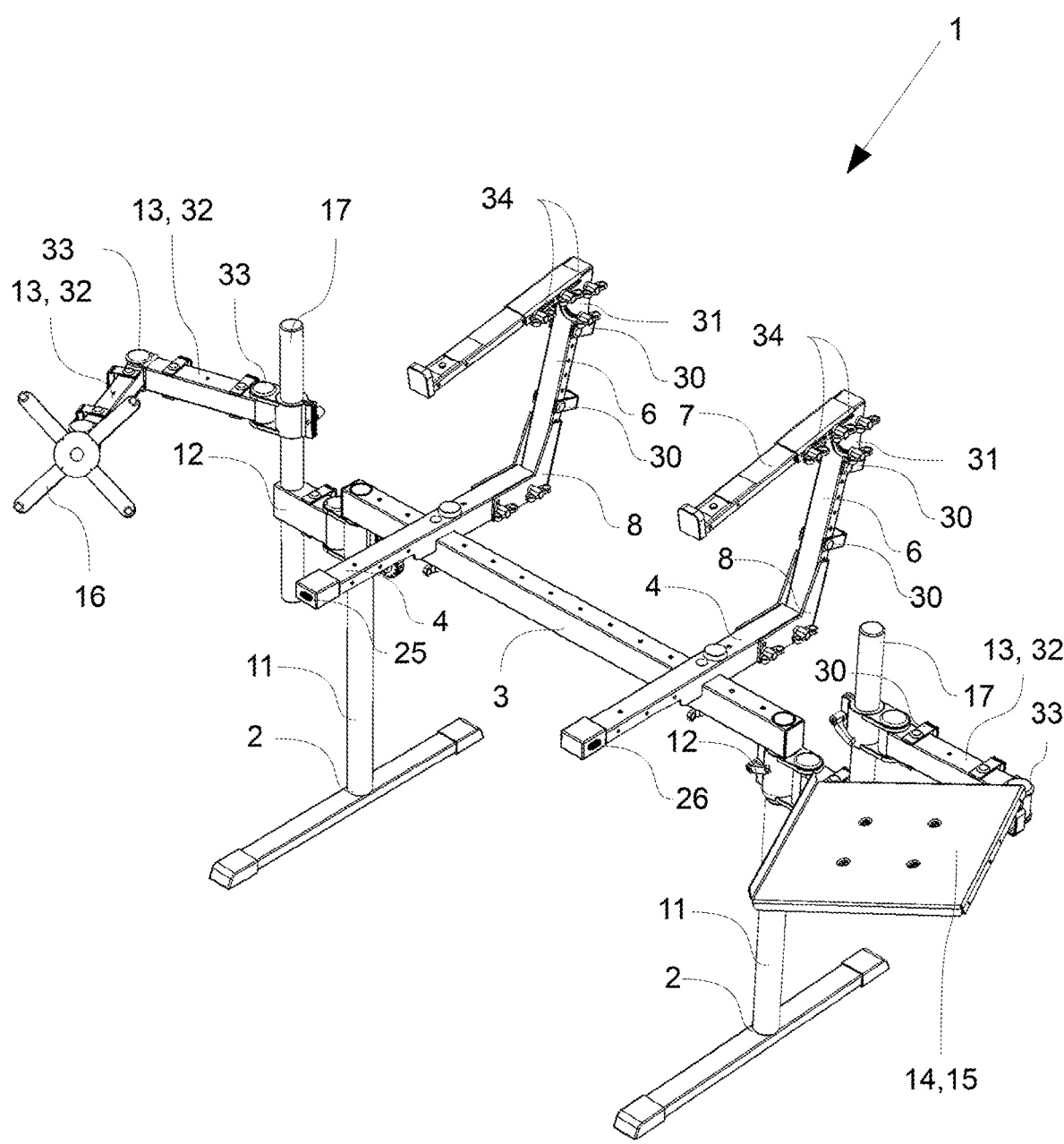

FIG. 2 shows a modular instrument and device rack 1 according to the invention as shown in FIG. 1, wherein, in deviation from or in addition to FIG. 1, a lateral attachment 12 is in each case attached laterally to the telescopic round tubes 11 of the vertical sections 11 of the T-shaped foot elements 2 in a fixed detachable pivotable manner. The lateral attachment 12 comprises in each case a vertical holding region 17 in the form of a round tube, on which in each case an angled pivot arm 13 with a joint is arranged so that the pivot arm 13 has two arm sections 32, which are connected with an intervening joint 33, there is a storage shelf 15 on one of the pivot arms 13 and a holder 16 on the other pivot arm 13. Cable holders 30 are also provided on the rear of the support elements 6 and on the pivot arms 13 or their two arm sections 32 and the lateral attachments 12.

Figure 3:
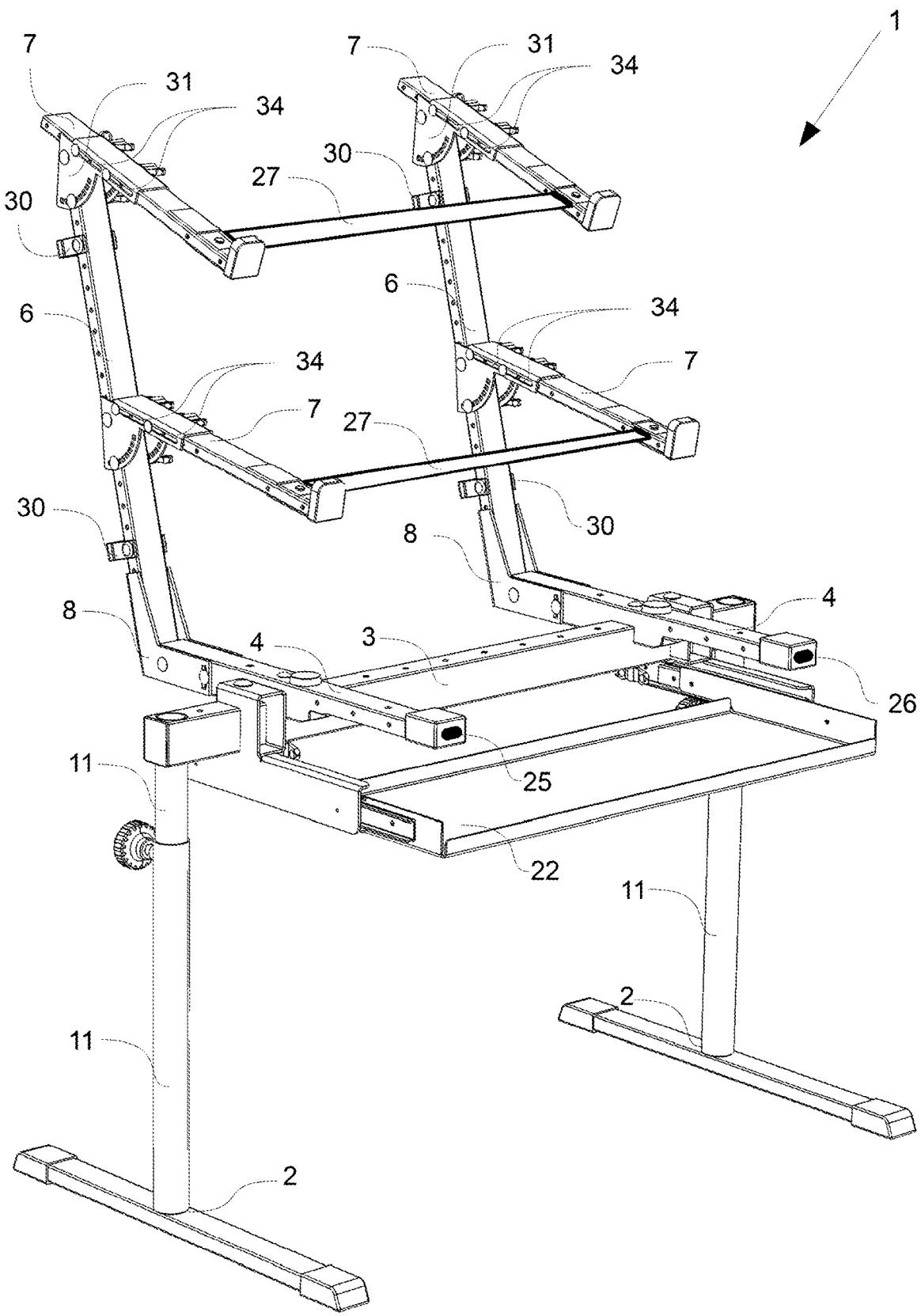

FIG. 3 shows a modular instrument and device rack 1 according to the invention as shown in FIG. 1, wherein, in deviation from or in addition to FIG. 1, two additional extension elements 7 are arranged in pairs at the same height on each at least of two bearing elements 4 via a respective support element 6. The respective extension elements 7 are respectively arranged in a fixedly detachable manner on the respective support elements 6 via angle adjustments 31 at a height and inclination differing from that of the bearing elements 4. The respective extension elements 7 are respectively arranged with the common support element 6 via a respective connecting element 8 on the respective bearing element 4. A pull-out shelf 22 is arranged on the connecting bridge 3, which can be retracted and extended or displaced below the connecting bridge 3. Between two extension elements 7 respectively, which are adjacent in pairs in one plane, lighting 27 is arranged as a linear luminaire or as a light strip. The cable holders 30 are also provided at the rear of the support elements 6.

Figure 4:
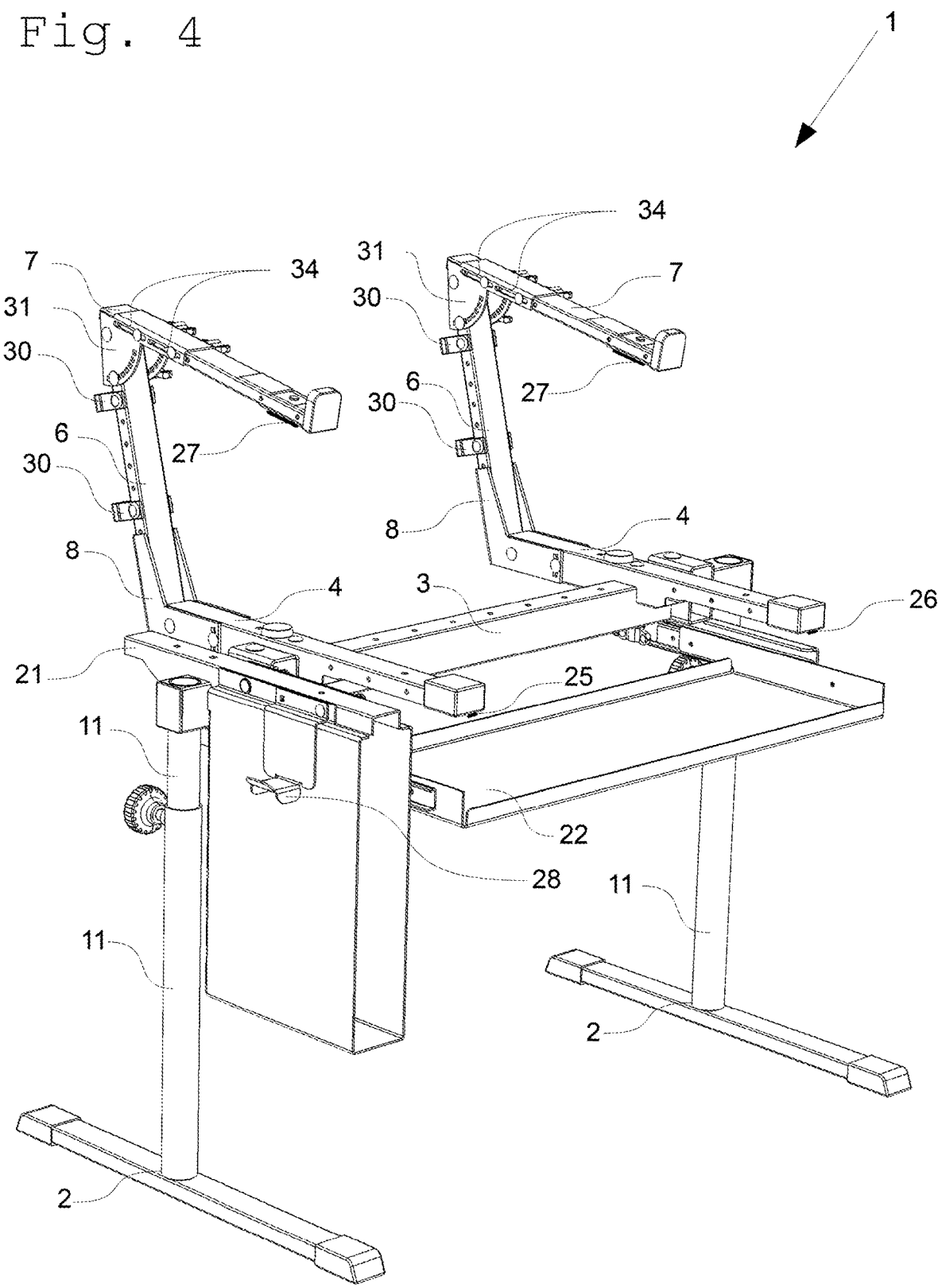

FIG. 4 shows a modular instrument and device rack 1 according to the invention as shown in FIG. 1, wherein, in deviation from or in addition to FIG. 1, a pull-out shelf 22 is arranged on the connecting bridge 3, which can be pulled in and out or moved underneath the connecting bridge 3, and wherein a holding compartment 19 or storage compartment 20 arranged on edge is provided on the connecting bridge 3 to the side of the pull-out shelf 22. The holding compartment 19 or storage compartment 20 is arranged on an additional mounting element 21 on the connecting bridge 3. In addition to it, a headphone holder 28 is arranged on the additional mounting element 21 next to the holding compartment 19 or storage compartment 20. In this case, the lighting 27 is arranged respectively at the front end on the underside of the two extension elements 7, which are adjacent in one plane in pairs. The cable holders 30 are also provided at the rear of the support elements 6.

Figure 5:
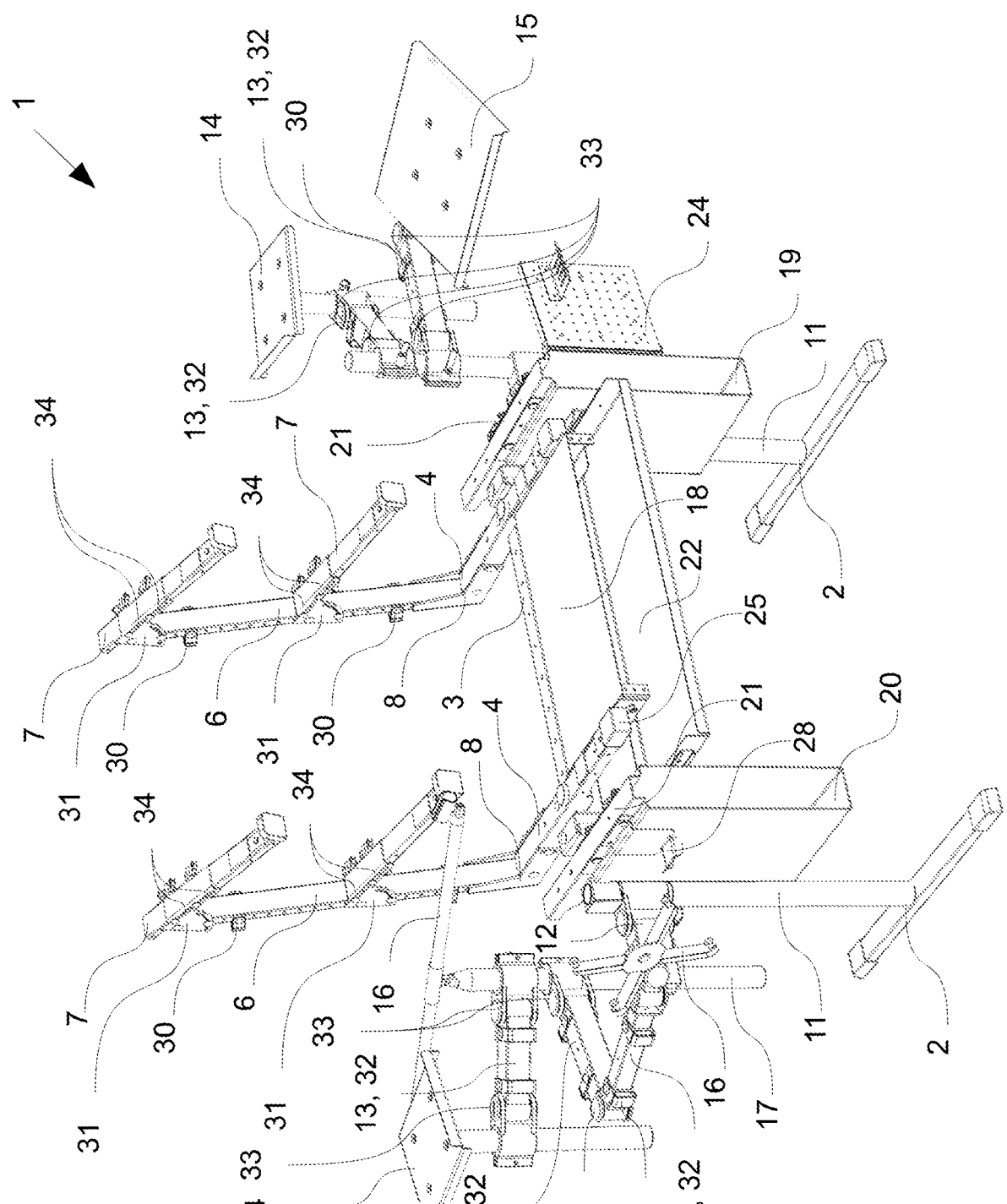

The design presented in FIG. 5 shows a modular instrument and device rack 1 according to the invention as shown in FIG. 3, wherein, in deviation from or in addition to FIG. 3, in each case on the side of the pull-out shelf 22 there is a holding compartment 19 or storage compartment 20 arranged on edge. The respective holding compartment 19 or storage compartment 20 is arranged on additional mounting elements 21 on the connecting bridge 3. A headphone holder 28 is arranged on the additional mounting elements 21 and next to the left-hand holding compartment 19 or storage compartment 20. A movable mounting hole plate 24 is arranged on the right-hand holding compartment 19 or storage compartment 20. Between and on the bearing elements 4, a housing 18 is provided and arranged as a 19-inch housing with a vertical module. In each case, a lateral attachment 12 is mounted to the side of the telescopic round tubes 11 of the vertical sections 11 of the T-shaped foot elements 2 in a fixed detachable pivotable manner, and the respective lateral attachment 12 comprises a vertical holding area 17 in the form of a round tube, on which a pivot arm 13 with at least one joint 33 respectively between two arm areas 32 and a pivot arm 13 with one arm area 32 respectively and one joint 33 respectively are arranged in the area of the respective bracket and on a tray 14, for example, for a loudspeaker. A storage shelf 15 is provided on one of the pivot arms 13 with a joint 33 and two arm areas 32, and a bracket 16 for a tablet PC, for example, is provided on the other pivot arm 13 with a joint 33 and two arm areas 32. Another bracket 16 for a microphone is directly mounted on the left-hand vertical holding area 17, on which the pivot arm 13 with a joint 33 for the bracket 16 is present. Cable holders 30 are provided on the support elements 6 as well as on the pivot arms 13 or their two arm areas 32 and the lateral attachments 12.

The extension elements 7 are arranged as outlined in FIGS. 1 and 3. Lighting in this example is not present.

Figure 6:
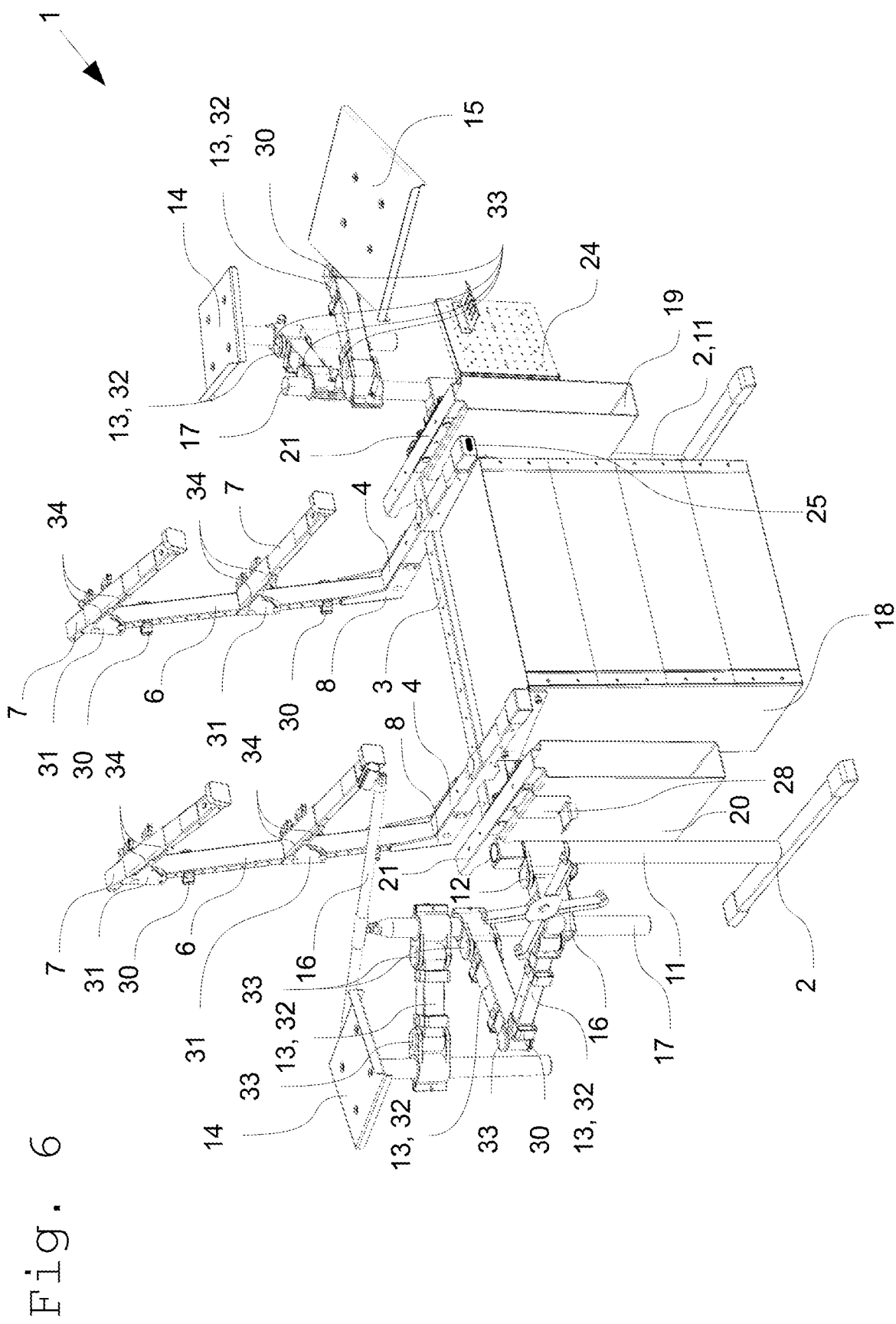

FIG. 6 shows a modular instrument and device rack 1 according to the invention as shown in FIG. 5, wherein, in deviation from or in addition to FIG. 5, a housing 18 is arranged instead of the pull-out shelf 22, wherein the housing 18 is a 19-inch rack housing arranged on the two bearing elements 4. The extension elements 7 are arranged as outlined in FIGS. 1 and 3. Cable holders 30 are provided on the support elements 6 as well as on the pivot arms 13 or their two arm areas 32 and the lateral attachments 12. A headphone holder 28 is arranged on the additional mounting elements 21 and next to the left-hand holding compartment 19 or storage compartment 20. Lighting in this example is not present.

In FIGS. 1 to 6, a storage plate 5, which can be placed on the bearing elements 4 is not shown.

Figure 7:
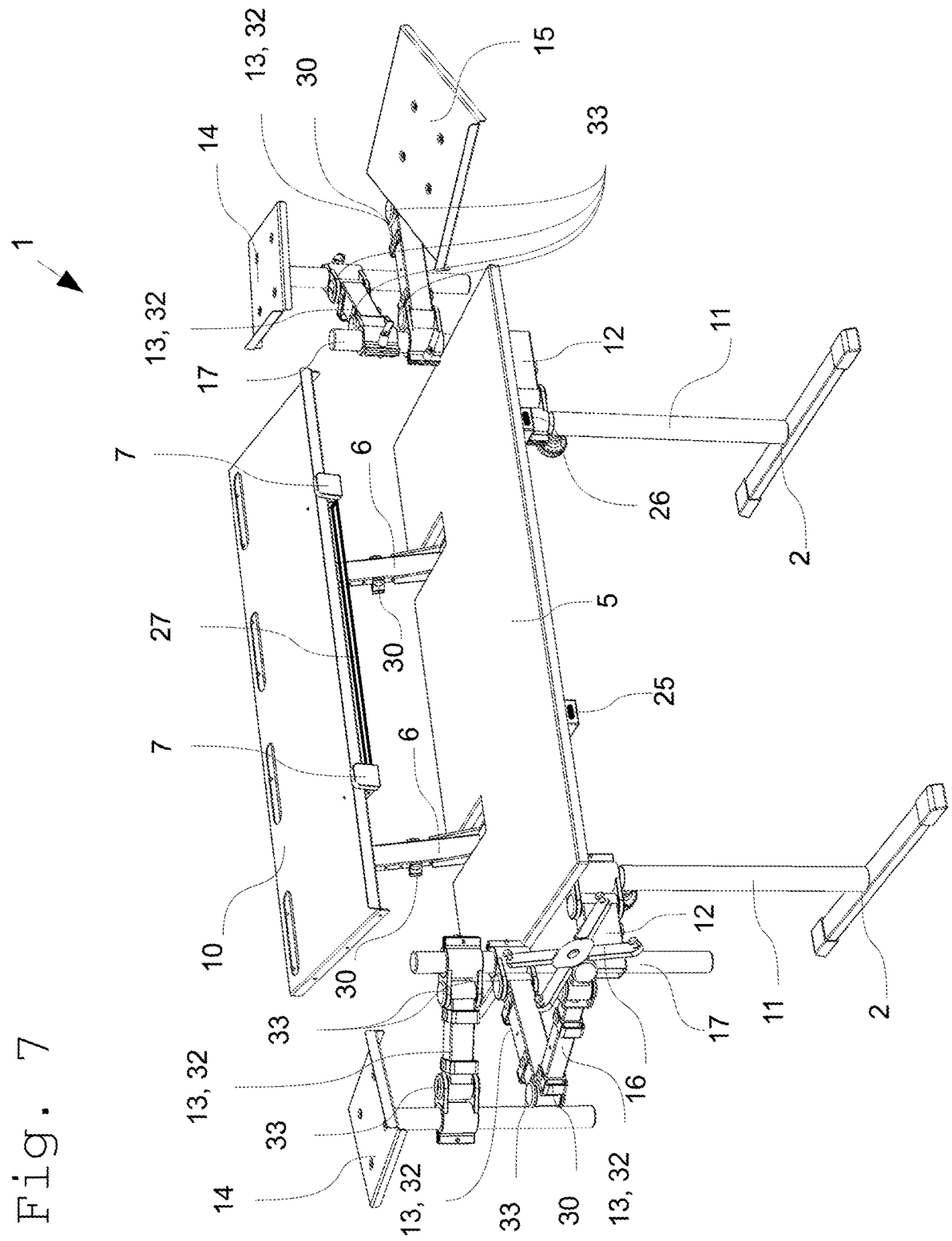

FIG. 7 shows a modular instrument and device rack 1 according to the invention as shown in FIG. 2, wherein in deviation from and in addition to FIG. 2, a storage plate 5 is mounted on the bearing elements 4, which due its depth, has recesses for the support elements 6, and whereby two extension elements 7 carry a shelf 10, and on the lateral attachments 12 on the respective vertical holding element 17 respectively a tray 14 is mounted, for example, for a loudspeaker. The extension elements 7 are arranged as outlined in FIGS. 1 and 3. At the front end of the two extension elements 7, which are adjacent in pairs in one plane, the lighting 27 is arranged between these extension elements 7 as a linear luminaire or as a light strip. Cable holders 30 are provided on the support elements 6 as well as on the pivot arms 13 or their two arm areas 32 and the lateral attachments 12.

Figure 8:
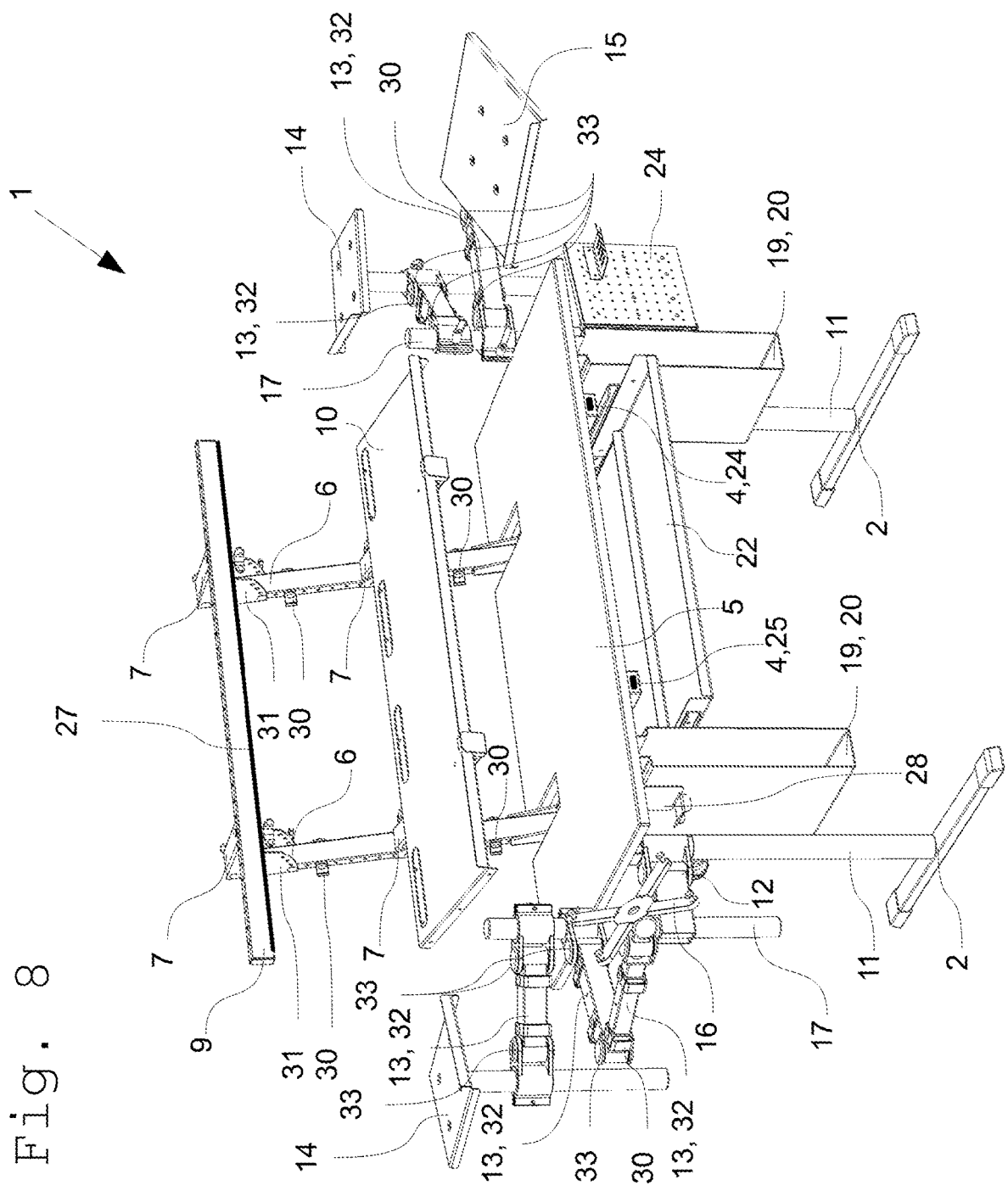

Furthermore, FIG. 8 shows a modular instrument and device rack 1 according to the invention as shown in FIG. 5, whereby, in deviation from FIG. 5, a storage plate 5 is arranged on the bearing elements 4, which due to its depth, has recesses for the support elements 6. The extension elements 7 are arranged as outlined in FIGS. 1 and 3. Furthermore, the two lower extension elements 7, which are adjacent in pairs, support a shelf 10. Two upper extension elements 7, which are adjacent in pairs, are of shortened design and are connected to one another via a transverse holder 9. In addition, the lighting 27 is provided on the transverse holder 9 as a linear luminaire or as a light strip. Cable holders 30 are provided on the support elements 6 as well as on the pivot arms 13 or their two arm areas 32 and the lateral attachments 12. A headphone holder 28 is arranged next to the left-hand holding compartment 19 or storage compartment 20. No housing 18 is provided as a 19-inch housing on the bearing elements 4 above the pull-out shelf 22.

Figure 9:
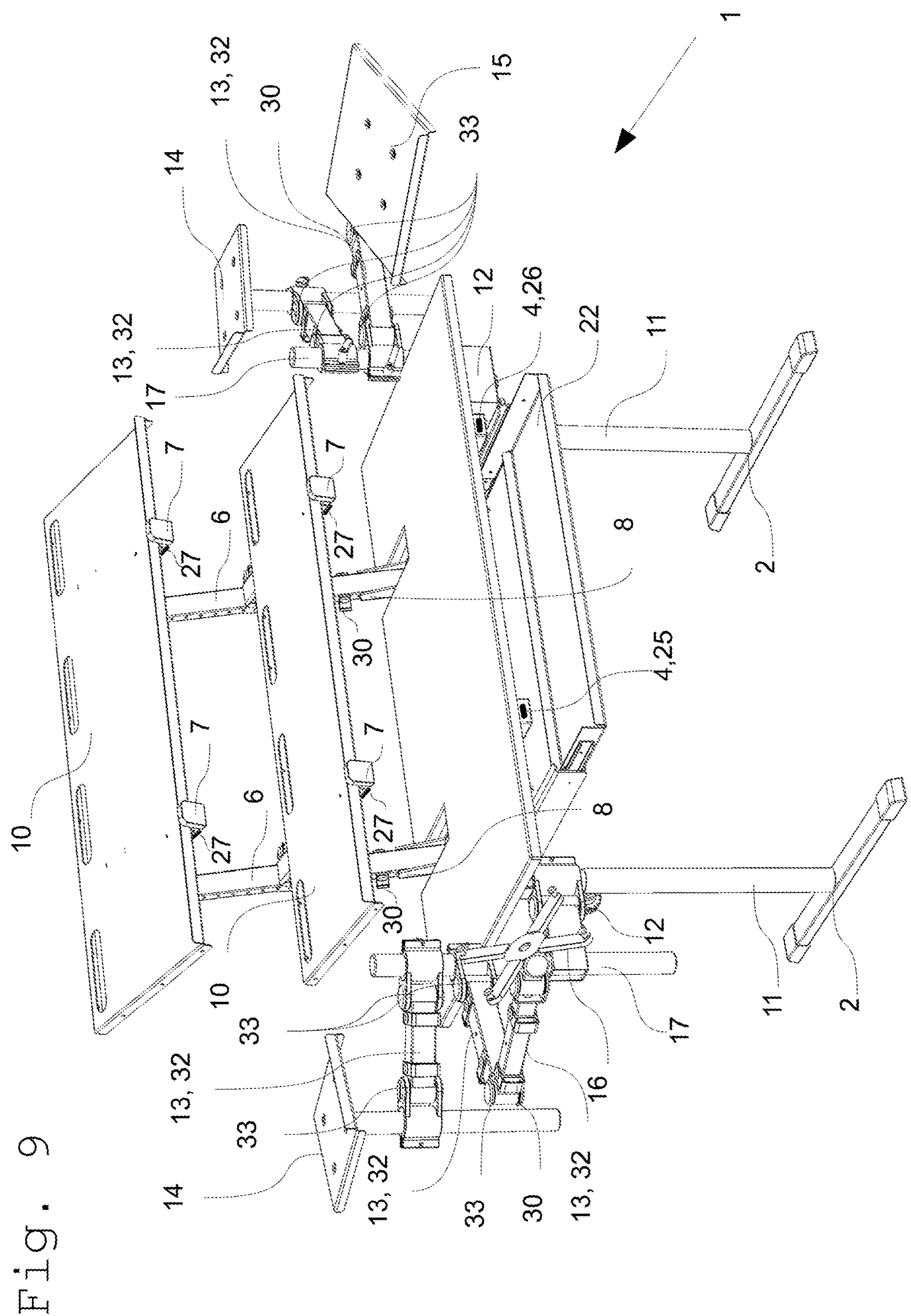

FIG. 9 shows a modular instrument and device rack 1 according to the invention as shown in FIG. 8, whereby, in deviation from or in addition to FIG. 8, a storage plate 5 is arranged on the bearing elements 4, which due to its depth, has recesses for the support elements 6. The extension elements 7 are arranged as outlined in FIGS. 1 and 3. Two extension elements 7, arranged in pairs in one plane respectively, support a shelf 10. In addition, a pull-out shelf 22 is provided on the bearing elements 4 or the connecting bridge 3. In this design example, at least the housing, the holding compartments and/or storage compartments and a mounting hole plate 24 are not shown. In this case, the lighting 27 is arranged respectively at the front end on the underside of the two extension elements 7, which are adjacent in one plane in pairs. Cable holders 30 are provided on the support elements 6 as well as on the pivot arms 13 or their two arm areas 32 and the lateral attachments 12.

Figure 10:
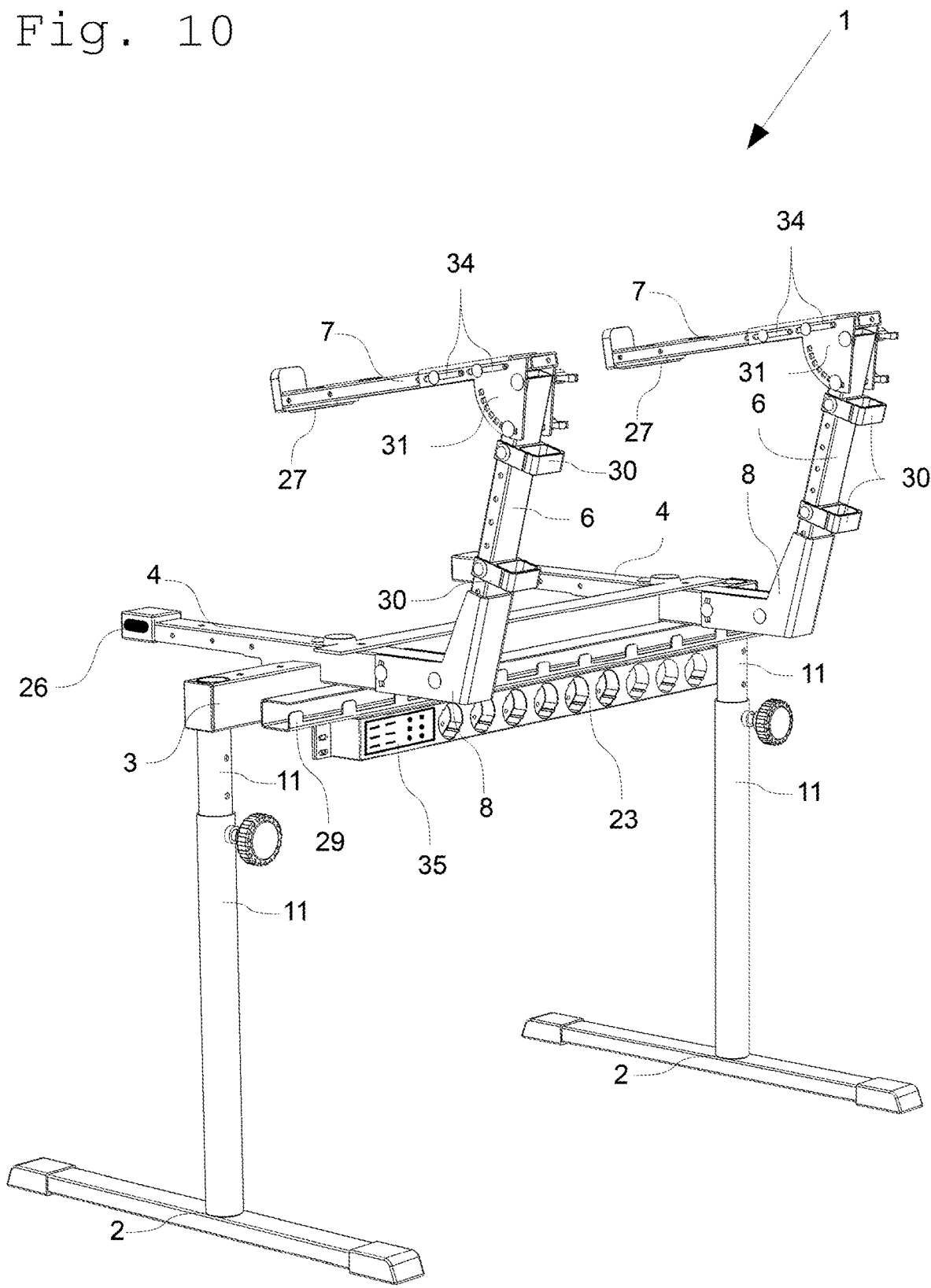

FIG. 10 shows a rear view of a modular instrument and device rack 1 according to the invention as shown in FIG. 1, whereby, in deviation from or in addition to FIG. 1, a power distribution unit 23 with sockets 23 and, in addition, a cable duct are provided on the connecting bridge 3. The power distribution unit provides additionally low voltages. For this purpose, a connection panel 35 with USB and round plug connection sockets for the low voltage is provided in the left-hand area. In this case, the lighting 27 is also arranged respectively at the front end on the underside of the extension elements 7, which are adjacent in pairs in one plane. The cable holders 30 are also provided on the support elements 6. A trunk cable duct 29 is provided above the power distribution unit 23 and in parallel therewith.

On the modular instrument and device rack 1 according to the invention, there is also, as shown in FIGS. 1 to 9, on one of the bearing elements 4 in the area of the front end of the front side, as shown in FIGS. 1 to 3, 5 to 8, laterally, as shown in FIG. 9, or from below, as shown in FIG. 4, a main switch 25 for switching on and off the entire power supply of the instrument and device rack 1. Due to perspective, the main switch 25 is not shown in FIG. 10.

Furthermore, as shown in FIGS. 1, 3, 4, 7 to 10, the lighting 27 is provided. In FIG. 2, lighting is provided but not shown. Correspondingly, in FIGS. 1 to 4 and 7 to 10, light switches 26 are present, which are also arranged on one of the bearing elements 4 in the area of the front end, whereby the respective bearing elements 4 differ from those with the main switch 25. In FIGS. 2 and 10, the light switch 26 is arranged laterally and in FIG. 4 from below in the area of the front end.

However, the respective main switch 25 and the light switch 26 can also be arranged on a common bearing element 4 at the front end. For example, the respective main switch 25 and the light switch 26 can respectively be arranged laterally on the common bearing element 4. Likewise, a downwardly directed arrangement of the respective switches 25, 26 is also possible.

Furthermore, the main switch 25 and/or the light switch 26 can also be arranged on one or more of the extension elements 7, correspondingly in the front area of the front side, laterally or from below and/or on the storage plate 5. Thus, the respective switches 25, 26 may be embedded from below or from above the storage plate 5.

LIST OF REFERENCE NUMERALS

1—Instrument and device rack
2—T-shaped foot element
3—Connecting bridge
4—Bearing element
5—Storage plate
6—Support element
7—Extension element
8—Connecting element
9—Transverse holder
10—Shelf
11—Vertical section, telescopic round tube
12—Lateral attachment
13—Pivot arm
14—Tray
15—Storage shelf
16—Bracket
17—Vertical holding element
18—Housing
19—Holding compartment
20—Storage compartment
21—Mounting element
22—Pull-out shelf
23—Socket, power distribution unit
24—Mounting hole plate
25—Main switch
26—Light switch
27—Lighting
28—Headphone holder
29—Trunk cable duct
30—Cable holder
31—Angle adjustment, angle adjustment plate
32—Arm section
33—Joint
34—Oblong hole
35—Oblong hole

The invention claimed is:

1. Modular instrument and device rack (1) for holding or storing electronic musical instruments and/or accessory devices, wherein two telescopically height-adjustable T-shaped foot elements (2), respective vertical sections (11) of which have at least one telescopic round tube (11), are connected via a connecting bridge (3), and at least two bearing elements (4) for a storage plate (5) are detachably fastened to the connecting bridge (3), wherein at least one support element (6) is arranged respectively on at least two bearing elements (4) and at least one extension element (7) is arranged respectively on the respective support elements (6), wherein at least one respective extension element (7) can be arranged in a fixedly releasable manner in an inclination via an angle adjustment (31), characterized in at least one respective extension element (7) can be arranged on the respective bearing element (4) via a respective connecting element (8), and at least one respective extension element (7) can be arranged on the respective support element (6) at least at one height which differs from that of the bearing elements (4), and in a case of two or more extension elements (7) to be arranged one above another, the respective extension elements (7) are respectively arranged with a common support element (6) on the respective bearing element (4) or connecting element (8), whereby the respective support element (6) is arranged adjustably in height and/or inclination at least on one connecting element (8) and/or that at least one connecting element (8) is connected or arranged adjustably in position and/or inclination with the respective bearing element (4)

and wherein individual extension elements or optionally extension elements arranged in pairs or groups at a same height can be arranged or aligned individually independently of the other extension elements optionally arranged in a different extension level.

2. Rack according to claim 1,
characterized in
that the respective extension elements (7) are arranged on the respective support element (6) such that they can be adjusted in height, position or depth via the angle adjustment (31).

3. Rack according to claim 1,
characterized in
that the respective extension elements (7) are each or individually continuously variable in length and/or are connected to one another via a transverse holder (9) and/or in that the respective extension elements (7) form a storage shelf or a shelf (10).

4. Rack according to claim 1,
characterized in
that a lateral extension (12) can be attached to at least one of the respective telescopic round tubes (11) in a fixedly detachable and/or pivotable and/or vertically adjustable manner.

5. Rack according to claim 4,
characterized in
that at least one lateral attachment (12) comprises at least one pivot arm (13), a tray (14), a storage shelf (15) and/or a bracket (16).

6. Rack according to claim 4,
characterized in
that at least one lateral attachment (12) comprises a round tube as a vertical holding element (17), wherein at least one pivot arm (13), at least one tray (14), at least one storage shelf (15) and/or at least one bracket (16) can be fixedly detachably and/or pivotably attached to the vertical holding area (17) at different heights.

7. Rack according to claim 1,
characterized in
that least at one housing (18) and/or at least one holding compartment (19) and/or storage compartment (20) is provided.

8. Rack according to claim 1,
characterized in
that at least one housing (18) and/or at least one holding compartment (19) and/or storage compartment (20) are arranged detachably fastened to at least two bearing elements (4) and/or to additional mounting elements (21) on the connecting bridge (3) and/or on the connecting bridge (3) and/or on the vertical section (11) at least of one of the T-shaped foot elements (2).

9. Rack according to claim 1,
characterized in
that a pull-out shelf (22) is arranged on the bearing elements (4) and/or between the holding compartments and/or between two extension elements (7) and/or on the additional mounting elements (21) on the connecting bridge (3) and/or on the connecting bridge (3).

10. Rack according to claim 7,
characterized in
that the at least one housing (18) is a 19-inch rack housing.

11. Rack according to claim 1,
characterized in
that at least one socket (23) or one power distribution unit (23) or mountings for sockets (23) or power distribution units (23) are arranged on the bearing elements (4) and/or on the connecting bridge (3), the power distribution unit providing mains voltage and/or low voltage in at least one voltage range.

12. Rack according to claim 1,
characterized in
that at least one lighting (27) is provided.

13. Rack according to claim 1,
characterized in
that a main switch (25) and/or light switch (26) is provided in a front area at least on one of the bearing elements (4) and/or extension elements (7) and/or on the storage plate (5).

14. Rack according to claim 7,
characterized in
that a fixed or movable mounting hole plate (24) is arranged at least on one housing (18) and/or at least on one holding compartment (19) and/or on the vertical section (11) at least of one of the T-shaped foot elements (2).

* * * * *